United States Patent
Pepelyaev et al.

(10) Patent No.: US 12,556,048 B2
(45) Date of Patent: Feb. 17, 2026

(54) METHOD FOR STARTING A ROTOR OF A CLAW POLE MOTOR

(71) Applicant: Bühler Motor GmbH, Nuremberg (DE)

(72) Inventors: Igor Pepelyaev, Nuremberg (DE); Sören Rebel, Nuremberg (DE); Tobias Roth, Gunzenhausen (DE); Thomas Peterreins, Nuremberg (DE)

(73) Assignee: Bühler Motor GmbH, Nuremberg (DE)

( * ) Notice: Subject to any disclaimer, the term of this patent is extended or adjusted under 35 U.S.C. 154(b) by 274 days.

(21) Appl. No.: 18/382,667

(22) Filed: Oct. 23, 2023

(65) Prior Publication Data

US 2024/0055917 A1    Feb. 15, 2024

Related U.S. Application Data

(63) Continuation-in-part of application No. PCT/DE2022/200060, filed on Apr. 1, 2022.

(30) Foreign Application Priority Data

Apr. 27, 2021    (DE) .................. 10 2021 110 689.3

(51) Int. Cl.
*H02P 1/46* (2006.01)
*H02K 1/24* (2006.01)
(Continued)

(52) U.S. Cl.
CPC ........... *H02K 1/243* (2013.01); *H02K 11/215* (2016.01); *H02P 6/16* (2013.01); *H02P 6/20* (2013.01)

(58) Field of Classification Search
CPC ..... H02P 7/05; H02P 6/16; H02P 6/20; H02K 3/50; H02K 1/243; H02K 11/215
See application file for complete search history.

(56) References Cited

U.S. PATENT DOCUMENTS

2008/0231140 A1    9/2008  Popov
2010/0207557 A1*   8/2010  Wilkinson ................ H02P 1/46
                                                318/400.15
(Continued)

FOREIGN PATENT DOCUMENTS

DE    29 01 000 A1    8/1980
DE    41 22 109 A1    1/1993
(Continued)

OTHER PUBLICATIONS

Office Action dated Oct. 28, 2021, issued in counterpart German Patent Application No. 10 2021 110 689.3. (4 pages).
(Continued)

*Primary Examiner* — Cortez M Cook
(74) *Attorney, Agent, or Firm* — WHDA, LLP

(57) ABSTRACT

A method for starting up a rotor of a single-phase claw-pole motor, wherein the claw-pole motor comprises a permanently excited rotor which executes a movement in a running direction in nominal operation, an electronically commutated stator and a Hall sensor for determining the relative rotor position, wherein the method comprises the steps of generating a pulse for moving the rotor in the direction opposite to the running direction by energizing a stator winding on the basis of an inverted Hall sensor signal; and starting up the rotor for movement in the running direction by energizing a stator winding on the basis of a Hall sensor signal.

7 Claims, 3 Drawing Sheets

(51) Int. Cl.
   *H02K 11/215*   (2016.01)
   *H02P 6/16*     (2016.01)
   *H02P 6/20*     (2016.01)

(56) References Cited

U.S. PATENT DOCUMENTS

2016/0344318 A1* 11/2016 Sun .......................... H02P 7/05
2018/0138791 A1   5/2018 Sun et al.
2019/0273422 A1*  9/2019 Kim ......................... H02K 3/50

FOREIGN PATENT DOCUMENTS

| DE | 10 2007 013 738 A1 | 9/2008 |
| DE | 10 2017 126 622 A1 | 5/2018 |
| EP | 0 216 202 A1 | 4/1987 |
| EP | 1 465 323 A2 | 10/2004 |

OTHER PUBLICATIONS

International Search Report dated Aug. 10, 2022, issued in counterpart International Application No. PCT/DE2022/200060. (3 pages).

* cited by examiner

METHOD FOR STARTING A ROTOR OF A CLAW POLE MOTOR

CROSS-REFERENCE TO RELATED APPLICATIONS

This present patent application is based on and claims priority to PCT Application No. PCT/DE2022/200060 filed on Apr. 1, 2022, which is based on German Application No. DE 10 2021 110 689.3 filed on Apr. 27, 2021, all of which are incorporated by reference in their entirety.

BACKGROUND OF THE INVENTION

(1) Field of the Invention

The invention relates to a method for starting up a rotor of a single-phase claw-pole motor.

(2) Description of Related Art Including Information Disclosed Under 37 CFR 1.97 and 1.98

Pumps can be used, for example, in motor vehicles for conveying and transporting liquids, for example coolants. Such pumps are usually operated by means of an electric drive which is operatively connected to the rotor of the pump. Single-phase claw-pole motors which have a permanently excited rotor and an electronically commutated stator can be used here as an electric drive. A Hall sensor is used to determine the relative rotor position which is necessary to commutate the current in the stator winding so that a rotational movement of the rotor can result.

For example, due to windmilling effects, it can happen that the latching position of the rotor is unfavorable, so that at start-up it could have difficulties overcoming the counter-torque during the first commutation. There is the risk here of an incorrect start-up of the pump, i.e., the rotor starts and moves counter to the running direction in nominal operation. There is also a risk of an incorrect start-up of the pump due to too low a latching torque or due to a large amount of friction.

BRIEF SUMMARY OF THE INVENTION

The object of the invention is to prevent an incorrect start-up of a rotor of a pump, in particular, in the case of a single-phase claw-pole motor.

The method according to the invention is provided for starting up a rotor of a single-phase claw-pole motor, wherein the claw-pole motor comprises a permanently excited rotor which executes a movement in a running direction during nominal operation, an electronically commutated stator and a Hall sensor for determining the relative rotor position. The method includes the following steps:
a. generating a pulse for moving the rotor in the direction opposite the running direction by energizing a stator winding on the basis of an inverted Hall sensor signal, and
b. starting up the rotor for movement in the running direction by energizing a stator winding on the basis of a Hall sensor signal.

BRIEF DESCRIPTION OF THE SEVERAL VIEWS OF THE DRAWINGS

The invention is explained in more detail below with regard to further features and advantages based on the description of exemplary embodiments and in reference to the accompanying drawings. In the drawings.

DETAILED DESCRIPTION OF THE INVENTION

Figure 3:
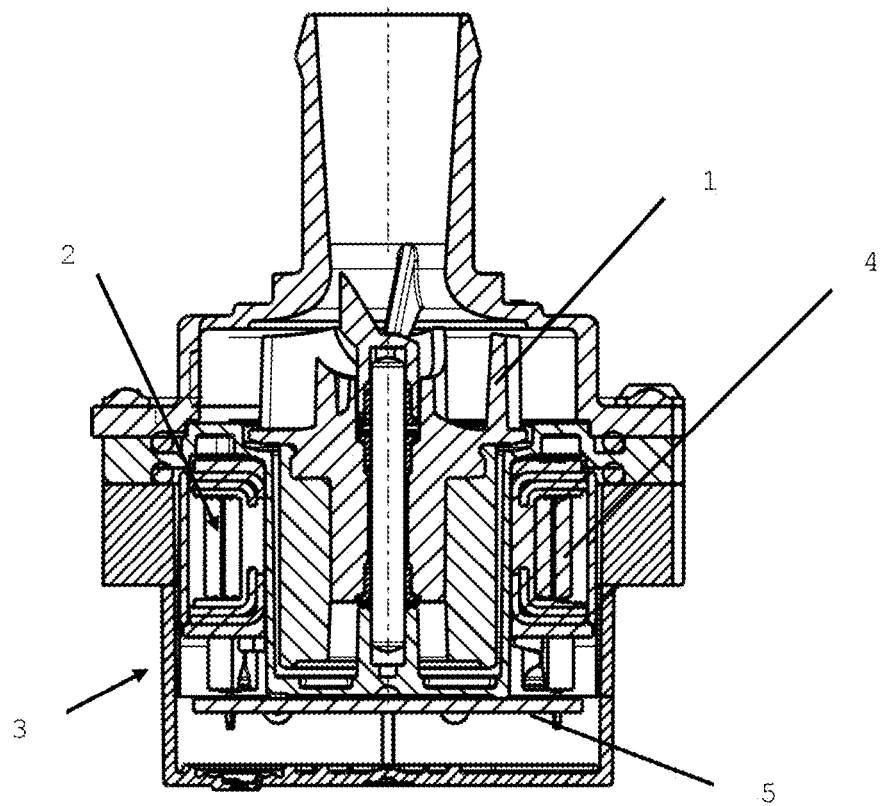
FIG. 3 is a cross-section drawing of a fluid pump.
Figure 4:
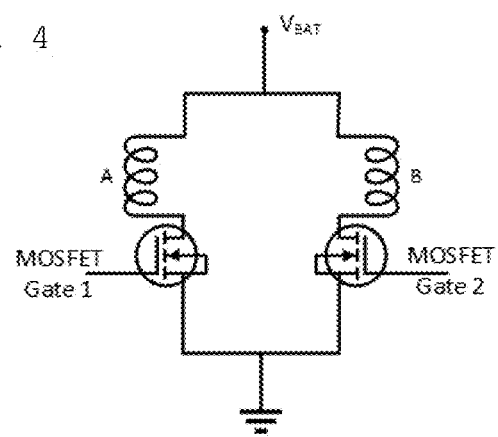
FIG. 4 is a circuit diagram of the circuit that operates the claw-pole motor.
Figure 5:
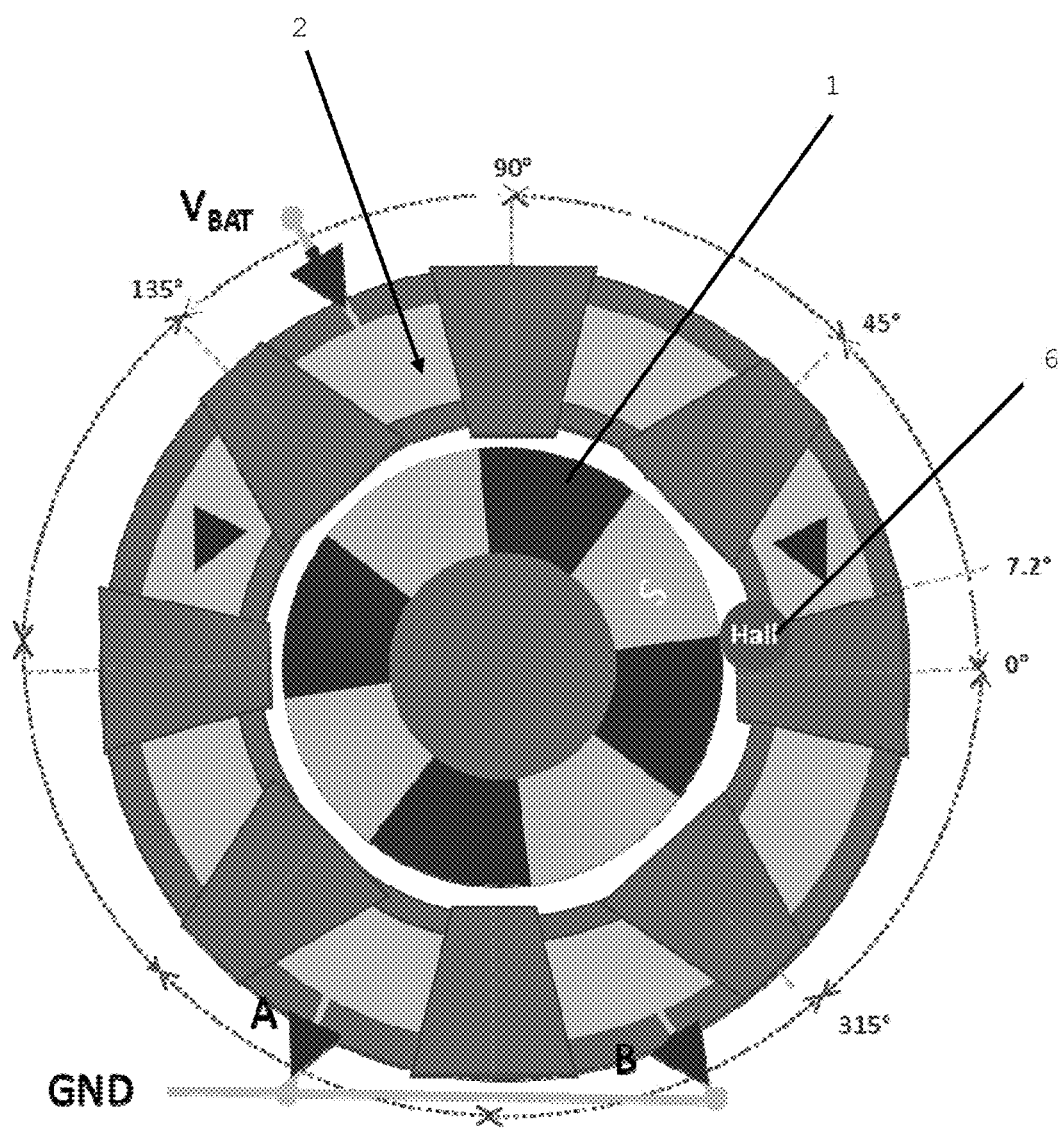
FIG. 5 is a plan view of the control of a single-phase claw-pole motor with Hall sensor based communication.

With reference to FIGS. 3-5, the method according to the invention is provided for starting up a rotor 1 of a single-phase claw-pole motor 3, wherein the claw-pole motor comprises a permanently excited rotor 1 which executes a movement in a running direction during nominal operation, an electronically commutated stator 2 and a Hall sensor 6 for determining the relative rotor position. The Hall sensor is connected to the stator and may be secured to a printed circuit board (PCB) 5.

The rotor 1 of the pump 10 can lock at any number of points, preferably 8 points, by latching when it is unenergized. The pump electronics shown in FIG. 4 start up the pump 10 while taking into account the signals of the Hall sensor 6 which is attached to the stator. The rotor position before start-up is defined by the latching torque (defined by the magnetic circuit), friction and external moments (for example due to overflows of the hydraulic circuit). When starting up from the rest position (latching position), the pump rotor 1 must overcome the brief motor-driven counter-torque during the first commutation in the direction of rotation, i.e., sufficient rotational energy must be generated. If this does not succeed, there will be a reversal of direction and thus an incorrect start-up of the rotor. Furthermore, the time of commutation can be shifted (for example by magnetization of the magnets and the positioning of the Hall sensor) and lead to the same problem. By means of a brief pulse counter to the running direction, the rotor receives more time and (start-up) travel provided in order to obtain sufficient momentum and thus to overcome the counter-torque.

It can preferably be provided that, in the event that during or immediately after the generation of a pulse for movement of the rotor in the direction opposite to the running direction, the start-up is interrupted for a prespecified period of time, and a pulse for moving the rotor in the direction opposite to running direction is again given for a prespecified period of time.

In order to prevent incorrect commutations, it is possible to monitor the Hall sensor 6 signal during and shortly after the generation of a pulse for movement in the direction opposite to the running direction of the rotor. If the Hall sensor signal detects changes during the monitoring time, the start-up will be stopped, and, after a short time (for example 150 ms), the generation of a previously described pulse is repeated.

At the Hall sensor position, the rotor field and the leakage field of the stator 2 are superimposed.

If the rotor is offset from the nominal position before the start-up to such an extent that the rotor magnetic field at the Hall sensor is very weak, the stator leakage field will be able to interfere impermissibly with the rotor magnetic field, so that the Hall sensor signal is directly inverted during the generation of the pulse, which leads to incorrect commutation.

In a preferred embodiment, when a limited number (for example three attempts) of repetitions of such a generation of pulses is exceeded, the rotor starts without a pulse being generated. This could be useful, for example, in the case of overcoming a blockage of the pump in which the start-up takes place without a pulse being generated for moving the rotor in the opposite running direction.

In a further embodiment, the predetermined time period is determined or specified depending on a supply voltage Vbat to the single-phase claw-pole motor. There is the possibility of changing the generation of at least one pulse with respect to the prespecified time period as a function of the supply voltage of the single-phase claw-pole motor. This advantageously decouples the energy input in the winding and the effective action for preventing or reducing incorrect start-ups as a function of the supply voltage. The corresponding prespecified values for the time duration can be calculated or determined experimentally. (Exemplary values are: 1.5 msec at <=11V; 1.1 msec 11V<V<=13.5V and 0.8 msec at >13.5V supply voltage)

Further preferably, a stator winding is energized by commutation of power electronics such as that shown in FIG. 4. These components are components typically used in the prior art, such as MOSFETs or IGBTs.

In one embodiment, the prespecified time period is selected such that, by moving the rotor in the direction opposite to the running direction, said rotor in the subsequent start-up experiences more acceleration than braking in order to overcome a counter-torque at a first commutation instant in order to ensure a movement in the running direction. An incorrect start-up is thus preferably prevented. At least one pulse can be used to ensure a correct start-up position.

Within the meaning of the invention, the pulse is a brief phase commutation in the opposite running direction before the actual start-up, i.e., an energizing of a stator winding on the basis of an inverted Hall sensor signal. In other words, the pulse moving the rotor in the opposite running direction ensures that the rotor during the subsequent start-up gains enough "momentum" in the correct direction of rotation to overcome the counter-torque during the first commutation.

According to one embodiment, the Hall sensor 6 is mounted on the stator 2 or on an electronic circuit board 5 and is arranged offset with respect to a central position of a stator pole in the direction of rotation. A start-up of the rotor in a correct direction of rotation is thereby ensured.

The single-phase claw-pole motor is preferably used in electric pumps, in particular in electric centrifugal pumps. However, other electric fluid pumps are also conceivable for the application.

Figure 1:
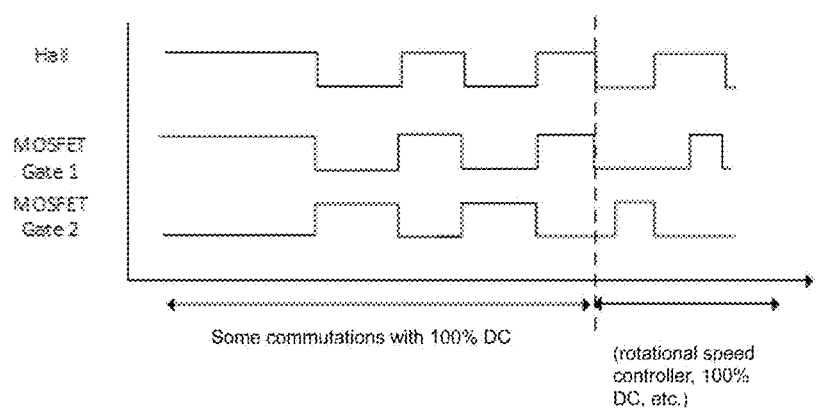
FIG. 1 shows a method sequence diagram of a start-up of a single-phase claw-pole motor according to the prior art.

FIG. 1 shows a method sequence diagram of a start-up of a single-phase claw-pole motor according to the prior art. FIG. 4 shows a circuit made up of the parallel arrangement of a MOSFET and an inductor (A and B) between a ground connection and an output for a voltage VBAT. The motor phases are commutated to start the start-up phase with 100% duty cycle with respect to the frequency of the Hall sensor; a different operating mode of the commutation can then be selected, for example further 100% duty cycle or a regulated rotational speed, or a controlled or regulated motor operation.

Depending on the rotor position (or: latching position, detent position, rest position) before the start-up, the rotor can start in the correct running direction or in the direction opposite to the running direction, resulting in a so-called incorrect start-up. In other words, the rest position of the rotor before the start-up is too close to a position of the first commutation instant to apply sufficient movement energy in the start-up to overcome the counter-torque.

The rotor position assumed by the rotor before the start-up depends on the tolerances or inaccuracies of the following components:
 i. magnetization of the working magnet
 ii. magnetization of the sensor magnet
 iii. positioning of the Hall sensor (shifts the commutation instant)
 iv. stator geometry/material and machining (influences the latching).

The (weak) acceleration of the rotor when starting up from the rest position into the actually correct movement direction is thus converted during the movement into braking energy, whereby the rotor brakes and stops. As a result, an acceleration acts on the rotor counter to the running direction and a braking direction acts on it in the running direction, so that the rotor moves counter to the running direction and an incorrect start-up may be present.

Figure 2:
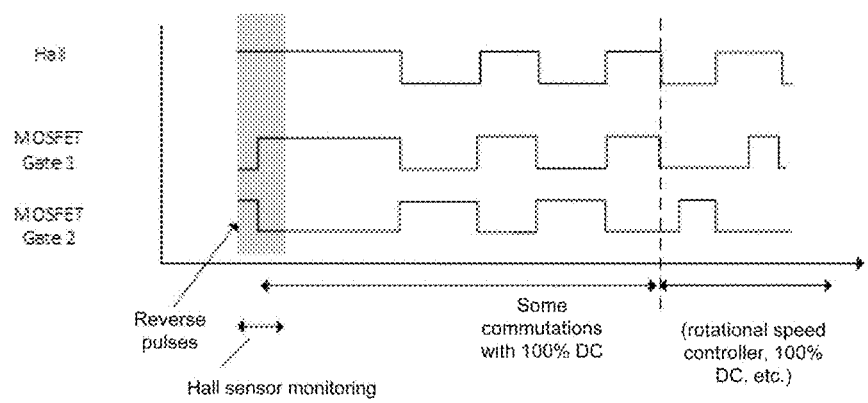
FIG. 2 shows a method sequence diagram of a start-up of a single-phase claw-pole motor according to the present invention.

FIG. 2 shows a method sequence diagram of a start-up of a single-phase claw-pole motor according to the present invention. A pulse is generated for moving the rotor in the direction opposite to the running direction by energizing a stator winding on the basis of an inverted Hall sensor signal. In particular, the pulse is generated before the beginning of the start-up. As a result, the rotor is moved back a certain distance in the direction opposite to the running direction. This allows the rotor to have an increased distance for creating enough acceleration energy to overcome the counter-torque after the first commutation instance. After the first commutation instance, a brief braking and a long acceleration phase result. The pulse is preferably a brief (for example 1.5 msec) phase commutation in the direction opposite to the running direction before the start-up, i.e., an energizing of a stator winding on the basis of an inverted Hall sensor signal. The reverse phase commutation results in the rotor shifting in the direction opposite to the running direction and, in the subsequent start-up, more acceleration than braking, which prevents starting up in the wrong direction.

During the start-up, there is a monitoring by means of a Hall sensor signal. After the pulse has been generated in the direction opposite to the running direction, some commutations are performed with 100% duty cycle, and then any operation is performed, for example further 100% duty cycle or a regulated rotational speed, or a controlled or regulated motor operation.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method for starting up a rotor of a single-phase claw-pole motor to correct an incorrect start-up, wherein the claw-pole motor comprises a permanently excited rotor which executes a movement in a running direction in nominal operation, an electronically commutated stator and a Hall sensor for determining the relative rotor position, wherein the method comprises the steps of:

a. generating a pulse for moving the rotor in the direction opposite to the running direction by energizing a stator winding on the basis of an inverted Hall sensor signal; and b. starting up the rotor for movement in the running direction by energizing a stator winding on the basis of a Hall sensor signal, wherein in the event that the start-up is interrupted for a prespecified period of time during or immediately after the generation of the pulse for movement of the rotor in the direction opposite to the running direction, a second pulse is generated for moving the rotor in the direction opposite to the running direction for a prespecified period of time.

2. The method according to claim 1, wherein, when a limited number of repetitions of such generation of pulses is exceeded, the rotor is started up without generating a pulse for movement in the running direction.

3. The method according to claim 1, wherein the prespecified period of time is determined or specified depending on a supply voltage of the single-phase claw-pole motor.

4. The method according to claim 1, wherein a stator winding is energized by power electronics being commutated.

5. The method according to claim 1, wherein the prespecified period of time is selected such that, by moving the rotor in the opposite running direction of said rotor during the subsequent start-up, more acceleration than braking is experienced in order to overcome a counter-torque at a first commutation instant in order to ensure a movement in the running direction.

6. The method according to claim 1, wherein the Hall sensor is mounted on the stator or on an electronic circuit board and is arranged offset with respect to a central position of a stator pole in the direction of rotation.

7. The method according to claim 1, wherein the single-phase claw-pole motor is used in electric centrifugal pumps.

* * * * *